(12) United States Patent
Freskos et al.

(10) Patent No.: US 7,853,676 B1
(45) Date of Patent: Dec. 14, 2010

(54) PROTOCOL FOR EFFICIENT EXCHANGE OF XML DOCUMENTS WITH A NETWORK DEVICE

(75) Inventors: Mark A. Freskos, Morrisville, NC (US); Michelle D. Hawke, St Albans (GB); Jonathan Turnbull, England (GB); Satyanarayana Raju, Union City, CA (US); Christopher Norris, San Jose, CA (US); Kapil Jain, San Jose, CA (US); David A. Tanner, Saratoga, CA (US); Dilbag Singh, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 1070 days.

(21) Appl. No.: 10/866,169

(22) Filed: Jun. 10, 2004

(51) Int. Cl.
    *G06F 15/173* (2006.01)
(52) U.S. Cl. .............. 709/223; 709/217; 709/231; 709/201
(58) Field of Classification Search ............ 709/223, 709/217, 201, 231
    See application file for complete search history.

(56) References Cited

U.S. PATENT DOCUMENTS

| | | | |
|---|---|---|---|
| 5,359,593 A | 10/1994 | Derby et al. | |
| 5,594,792 A | 1/1997 | Chouraki et al. | |
| 5,928,331 A | 7/1999 | Bushmitch | |
| 5,968,176 A | 10/1999 | Nessett et al. | |
| 5,970,064 A | 10/1999 | Clark et al. | |
| 6,009,081 A | 12/1999 | Wheeler et al. | |
| 6,021,263 A | 2/2000 | Kujoory et al. | |
| 6,021,439 A | 2/2000 | Turek et al. | |
| 6,028,842 A | 2/2000 | Chapman et al. | |
| 6,046,980 A | 4/2000 | Packer | |
| 6,047,322 A | 4/2000 | Vaid et al. | |
| 6,061,725 A | 5/2000 | Schwaller et al. | |
| 6,104,700 A | 8/2000 | Haddock et al. | |
| 6,118,760 A | 9/2000 | Zaumen et al. | |
| 6,154,776 A | 11/2000 | Martin | |
| 6,154,878 A | 11/2000 | Saboff | |

(Continued)

OTHER PUBLICATIONS

S. Blake, et al., "An Architecture for Differentiated Services," Dec. 1998, Network Working Group, Request for Comments: 2475, pp. 1-36.

(Continued)

*Primary Examiner*—Wilson Lee
*Assistant Examiner*—Tuan-Khanh Phan
(74) *Attorney, Agent, or Firm*—Hickman Palermo Truong & Becker LLP

(57) ABSTRACT

A method and apparatus for the configuration of a network device through the exchange of XML documents is provided. A network device transmits multiple chunks of an XML document to a client in response to the size of the XML document being larger than a configurable size. The client does not receive any XML documents from network device that exceed the configurable size, and may abort receiving additional chunks of the XML document. The client and the network device may each discover which version of a data schema each other is using to reference components of the network device. The exchanged XML documents include version data that identifies a version for a plurality of data schemas that are each associated with a component of network device. The client and the network device may thus avoid exchanging ambiguous communications due to inconsistent versions of a data schema.

13 Claims, 4 Drawing Sheets

U.S. PATENT DOCUMENTS

| | | | |
|---|---|---|---|
| 6,167,445 A | 12/2000 | Gai et al. | |
| 6,169,748 B1 | 1/2001 | Barbas et al. | |
| 6,170,009 B1 | 1/2001 | Mandal et al. | |
| 6,212,184 B1 | 4/2001 | Venkatachary et al. | |
| 6,249,844 B1 * | 6/2001 | Schloss et al. | 711/122 |
| 6,286,052 B1 | 9/2001 | McCloghrie et al. | |
| 6,301,253 B1 | 10/2001 | Ichikawa | |
| 6,301,613 B1 | 10/2001 | Ahlstrom et al. | |
| 6,324,184 B1 | 11/2001 | Hou et al. | |
| 6,327,618 B1 | 12/2001 | Ahlstrom et al. | |
| 6,363,429 B1 | 3/2002 | Ketcham | |
| 6,393,473 B1 | 5/2002 | Chu | |
| 6,401,240 B1 | 6/2002 | Summers | |
| 6,424,659 B2 | 7/2002 | Viswanadham et al. | |
| 6,430,154 B1 | 8/2002 | Hunt et al. | |
| 6,442,151 B1 | 8/2002 | H'mimy et al. | |
| 6,463,470 B1 | 10/2002 | Mohaban et al. | |
| 6,466,984 B1 | 10/2002 | Naveh et al. | |
| 6,473,793 B1 | 10/2002 | Dillion et al. | |
| 6,483,805 B1 | 11/2002 | Davies et al. | |
| 6,484,261 B1 | 11/2002 | Wiegel | |
| 6,490,564 B1 | 12/2002 | Dodrill et al. | |
| 6,539,425 B1 | 3/2003 | Stevens et al. | |
| 6,570,875 B1 | 5/2003 | Hegde | |
| 6,577,644 B1 | 6/2003 | Chuah et al. | |
| 6,584,508 B1 | 6/2003 | Epstein et al. | |
| 6,594,268 B1 | 7/2003 | Aukia et al. | |
| 6,601,082 B1 | 7/2003 | Durham et al. | |
| 6,611,864 B2 | 8/2003 | Putzolu et al. | |
| 6,621,793 B2 | 9/2003 | Widegren et al. | |
| 6,622,170 B1 | 9/2003 | Harrison et al. | |
| 6,625,657 B1 | 9/2003 | Bullard | |
| 6,651,191 B1 | 11/2003 | Vacante et al. | |
| 6,671,724 B1 | 12/2003 | Pandya et al. | |
| 6,684,244 B1 | 1/2004 | Goldman et al. | |
| 6,760,761 B1 | 7/2004 | Sciacca | |
| 6,826,597 B1 | 11/2004 | Lonnroth et al. | |
| 6,910,073 B2 * | 6/2005 | Banga et al. | 709/225 |
| 6,952,703 B1 | 10/2005 | Kathail et al. | |
| 7,054,901 B2 | 5/2006 | Shafer | |
| 7,096,256 B1 | 8/2006 | Shafer | |
| 7,111,206 B1 | 9/2006 | Shafer et al. | |
| 7,114,008 B2 | 9/2006 | Jungck et al. | |
| 7,146,414 B1 | 12/2006 | Sievert et al. | |
| 7,249,219 B1 * | 7/2007 | Mowat et al. | 711/113 |
| 7,305,658 B1 | 12/2007 | Hamilton et al. | |
| 7,506,337 B2 | 3/2009 | Iyer | |
| 2001/0056547 A1 * | 12/2001 | Dixon | 713/200 |
| 2002/0174207 A1 | 11/2002 | Battou | |
| 2003/0120678 A1 * | 6/2003 | Hill et al. | 707/102 |
| 2005/0033805 A1 | 2/2005 | Fujiyama et al. | |
| 2005/0157752 A1 * | 7/2005 | Takase et al. | 370/468 |
| 2005/0204186 A1 | 9/2005 | Rothman et al. | |
| 2005/0246687 A1 | 11/2005 | Scott | |
| 2006/0080424 A1 | 4/2006 | Sun et al. | |

OTHER PUBLICATIONS

D. Durham, et al., "The COPS (Common Open Policy Service) Protocol," Jan. 2000, Network Working Group, Request for Comments: 2748, pp. 1-38.

S. Herzog, et al., "COPS usage for RSVP," Jan. 2000, Network Working Group, Request for Comments: 2749, pp. 1-17.

R. Braden, et al., "Resource ReSerVation Protocol (RSVP)—Version 1 Functional Specification," Sep. 1997, http://www.ietf.org/rfc/rfc2205.txt.?number=2205, printed Sep. 19, 2003, pp. 1-105.

U.S. Appl. No. 11/043,281, filed Jan. 25, 2005, Notice of Allowance, Mailing Date Mar. 29, 2010.

* cited by examiner

PROTOCOL FOR EFFICIENT EXCHANGE OF XML DOCUMENTS WITH A NETWORK DEVICE

RELATED APPLICATIONS

This application is related to co-pending U.S. patent application Ser. No. 10/866,338, filed Jun. 10, 2004, invented by Mark Freskos et al., entitled "Transport-Independent Pluggable Operation Type Handler Framework For Servicing Management Requests," the entire disclosure of which is hereby incorporated by reference as if fully set forth herein.

This application is also related to co-pending U.S. patent application Ser. No. 10/866,067, filed Jun. 10, 2004, invented by Jiong Sun et al, entitled "A Generic Framework For Deploying EMS Provisioning Services," the entire disclosure of which is hereby incorporated by reference as if fully set forth herein.

This application is also related to co-pending U.S. patent application Ser. No. 10/866,647, filed Jun. 10, 2004, invented by Mark Freskos et al, entitled "Two-Stage Network Device Configuration Model," the entire disclosure of which is hereby incorporated by reference as if fully set forth herein.

This application is also related to co-pending U.S. patent application Ser. No. 10/866,528, filed Jun. 10, 2004, invented by Kapil Jain et al, entitled "Configuration Commit Database Approach And Session Locking Approach In A Two-Stage Network Device Configuration Process," which is a continuation of co-pending U.S. patent application Ser. No. 10/866,647, the entire disclosure of which is hereby incorporated by reference as if fully set forth herein.

FIELD OF THE INVENTION

The present invention generally relates to communication between a client and a network device through the exchange of XML documents.

BACKGROUND

Contemporary network device communication systems may provide responses using structured electronic documents, such as XML documents. A user may retrieve the configuration of a network device by issuing a request, and the network device responds with an XML document that contains its then-current configuration. Responses, such as XML documents, from network devices are often of a large size, which may lead to increased burden on client, the network device, and the network itself. Further, in some environments a network device, server, or other element that stores and delivers a large XML document as a response, has limited memory available for storing the document. To address these issues, having a way to break up large response documents is desirable.

One approach to solve this problem is to use a transport dependent mechanism that can communicate documents in chunks, such as Blocks Extensible Exchange Protocol (BEEP). In this approach, if both communicating parties (e.g., the client and the network device) support the transport protocol that implements BEEP, a first party may request and receive only a portion of a communication from the second party. However, both parties must be configured to communicate using the transport protocol and BEEP. As most networks today are evolving at an accelerated pace and consist of a variety of clients and network devices, it is undesirable to require each client and each network device in the network to be configured to communicate using a specific transport protocol, as it may be impossible or impracticable for one or more clients and/or network devices to be configured to communicate using the specific transport protocol. Further, BEEP requires that the entire XML response is created or known in advance of transport.

In another approaches, a receiving client provides instructions for retrieving data in portions. The client instructions specify a range of desired data or a set of desired portions for retrieval. When those portions are retrieved, the client provides further instructions to retrieve the next portions in order. However, in these approaches, the client needs to know the contents or structure of the data it is retrieving, and may need to calculate how many items the client can retrieve at once. The client may also need to know the names of items that are retrieved. Further, in most approaches, there is no potential for a responding network device or server to break up a response when the network device or server knows that the receiving client will need a relatively long time to process the response.

Another problem encountered when configuring network devices over a network is that the client may use a different version of a data schema for a particular component on the network device than the network device uses for that same component. This may happen when a data schema associated with either the client or the network device is updated without updating the corresponding data schema on the other. When the client and the network device each expect configuration data in a particular data schema to be represented differently, a request from a client to update the configuration using that particular data schema may result in either the operation being unable to be processed on the network device or it may result in the introduction of errors in the configuration of the network device.

One approach in solving this problem is for the network device to associate a version number with an Application Programming Interface (API) that allows the client to communicate with the network device. The client may use the API version number to determine if the commands and requests that client is using are current or out of date. However, this approach is problematic in that the version number applies to the API as a whole, and must be updated each time that there is any change in any way the network device interacts with the client. Consequently, there are many false occurrences of version incompatibility in this approach, as a request from a client using a particular API call with an out-of-date version number may still be compatible, since the call may only invoke functions or software components of the network device that have not changed since that version.

In another approach, exemplified by Simple Network Management Protocol (SNMP), no version numbers are used, but each new version must handle all previous versions transparently. Thus, old functions are not removed, and only new functions are added. However, this approach is problematic because those who develop or maintain a new version also must support all old versions. Further, if a response to a GET request appears to be missing a data element, an application may be unable to determine if the responding network device omitted the element because no data is available, or because that element is no longer supported.

Consequently, there is a need in the art to configure a network device through the exchange of communications without encountering the problems associated with the approaches discussed above. The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments described herein are illustrated by way of example, and not by way of limitation, in the figures of the accompanying drawings and in which like reference numerals refer to similar elements and in which.

DETAILED DESCRIPTION

Figure 1:
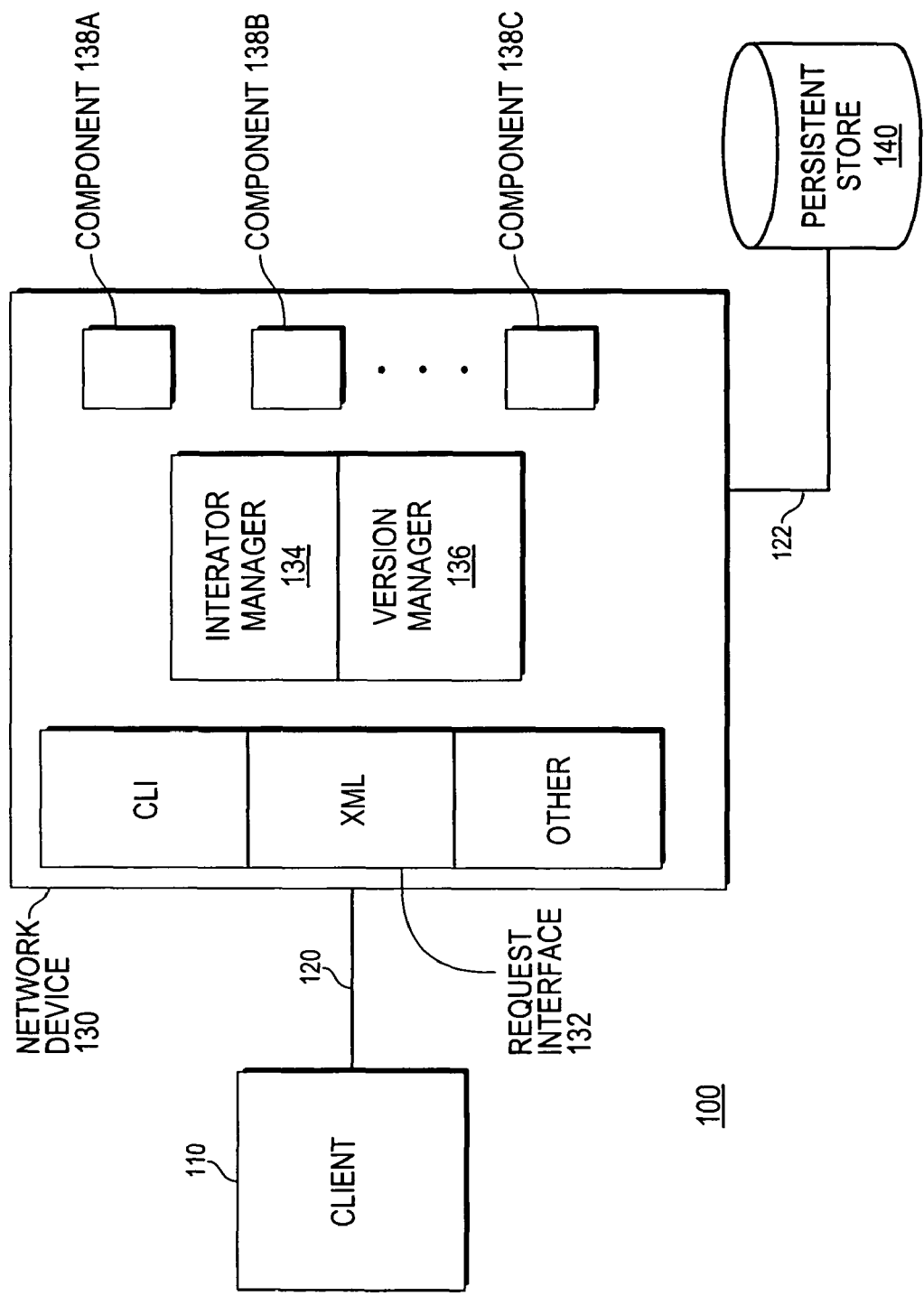
FIG. 1 is a block diagram of a system according to an embodiment.

In the following description, for the purposes of explanation, numerous specific details are set forth in order to provide a thorough understanding of the embodiments disclosed herein. It will be apparent, however, that the embodiments described herein may be practiced without these specific details. In other instances, well-known structures and devices are shown in block diagram form in order to avoid unnecessarily obscuring the description of the embodiments disclosed herein.

Functional Overview

1. Large XML Documents. Techniques are presented for the configuration of network devices using XML documents. The burden placed on clients, network device, and networks from communications of large size may be avoided using embodiments of the invention. Further, embodiments address the restriction of memory overhead on the server for storing the XML response; provide the potential ability for the server to break up a response if it knows that the next section will take a long time to process; and do not require the client to know anything about the contents or structure of the data that the client is retrieving.

In an embodiment, a request from a client is received at a network device. The network device generates response data that indicates a result of performing the request, and constructs a XML document that contains the response data. The network device determines that the XML document exceeds a configurable threshold. The purpose of the configurable threshold is to ensure that the size of all XML documents transmitted from the network device to the client is under a certain size. An administrator may configure the configurable threshold to be any size.

The network device transmits only a portion of the XML document to the client along with an identifier. The portion transmitted is of a smaller, manageable size. The identifier included in the portion indicates to the client that the client has not received the entire XML document. The client may then issue another request to the network device for another portion of the XML document. The network device transmits one or more other portions of the XML document to the client. When the client receives the last portion of the XML document to the client, the network device does not include the identifier, thus signaling to the client that the client has received the last portion of the XML document. In this way, the client may receive the entire XML document in one or more portions whose size does not exceed a configurable threshold.

2. Versioning of XML Documents. In another embodiment, the client and the network device may avoid exchanging ambiguous communications due to inconsistent versions of a data schema used by the client and the network device. XML documents exchanged between the client and the network device may include version data. Version data identifies a version of a plurality of data schemas that are each associated with a component of the network device. The network device may have a plurality of components, and the version data may identify a version of a data schema associated with each component. The network device may determine whether to perform or not perform a request received from a client based on a comparison of version data identified in the request and version data maintained by the network device.

Architecture Overview

FIG. 1 is a block diagram of a system 100 according to an embodiment. System 100 includes a client 110, communications links 120 and 122, a network device 130, and a persistent store 140.

A client, such as client 110, may be implemented by any medium or mechanism that provides for the transmission of a command or request to a network device. Client 110 may be implemented in software or in hardware. Examples of client 110 include, without limitation, a web browser, a software application executing on a machine, a wireless device, and a management console. While only client 110 is shown in FIG. 1, embodiments may include any number of clients in system 100.

Communications link 120 may be implemented by any medium or mechanism that provides for the exchange of data between client 110 and network device 130. Communications link 122 may be implemented by any medium or mechanism that provides for the exchange of data between network device 130 and persistent store 140. Examples of communications links 120 and 122 include, without limitation, a network such as a Local Area Network (LAN), Wide Area Network (WAN), Ethernet or the Internet, or one or more terrestrial, satellite or wireless links.

A network device, such as network device 130, may be implemented by a device that is accessible to a network and is capable of being configured. Examples of network device 130 include, without limitation, a router, a server, a PC, a wireless device, a firewall, and a cell phone. While only one network device 130 is shown in FIG. 1 for purposes of illustrating a simple example, other embodiments may include any number of network devices in system 100.

Network device 130 includes a request interface 132, an iterator manager 134, a version manager 136, and one or more components 138. A request interface, such as request interface 132, may be implemented by any software component executing on network device 130 that is capable of exchanging communications with client 110. Request interface 132 may exchange communications using a variety of transport protocols. Request interface 132 may also process communications encoded using a variety of formats, grammars, or protocols, including, but not limited to, XML.

An iterator manager, such as iterator manager 134, may be implemented by any software component executing on network device 130 that is capable of determining if a XML document exceeds a configurable threshold. The operation of iterator manager 134 is described in further detail below in the section entitled "Retrieving XML Documents using a Transport Independent Iterator."

A version manager, such as a version manager 136, may be implemented by any software component executing on network device 130 that is capable of comparing version data contained within a received request with version data maintained at network device 130 to determine whether to perform one or more operations identified by the received request. The operation of the version manager 136 is described in further detail below in the section entitled "Retrieving XML Documents using Version Data."

A component, such as component 138A, 138B, and 138C, refers to any hardware or software component of network device 130 that may be separately configurable. Examples of component 138A, 138B, and 138C include, without limitation, a line card, a route processor, and a software module.

A persistent store, such as persistent store 140, as broadly used herein, refers to any medium or mechanism that provides for the persistent storage of data. Examples of persistent store 140 include, without limitation, non-volatile memory, disk storage, a relational database, an object-oriented database, a multidimensional database, a hierarchical database, a file server, and an EPROM chip. Note that persistent store 140 may be implemented on network server 130 (not shown in FIG. 1), but for ease of explanation, persistent store 140 is described as a separate component from network device 130, although it need not be.

Retrieving XML Documents Using a Transport Independent Iterator

Figure 2:
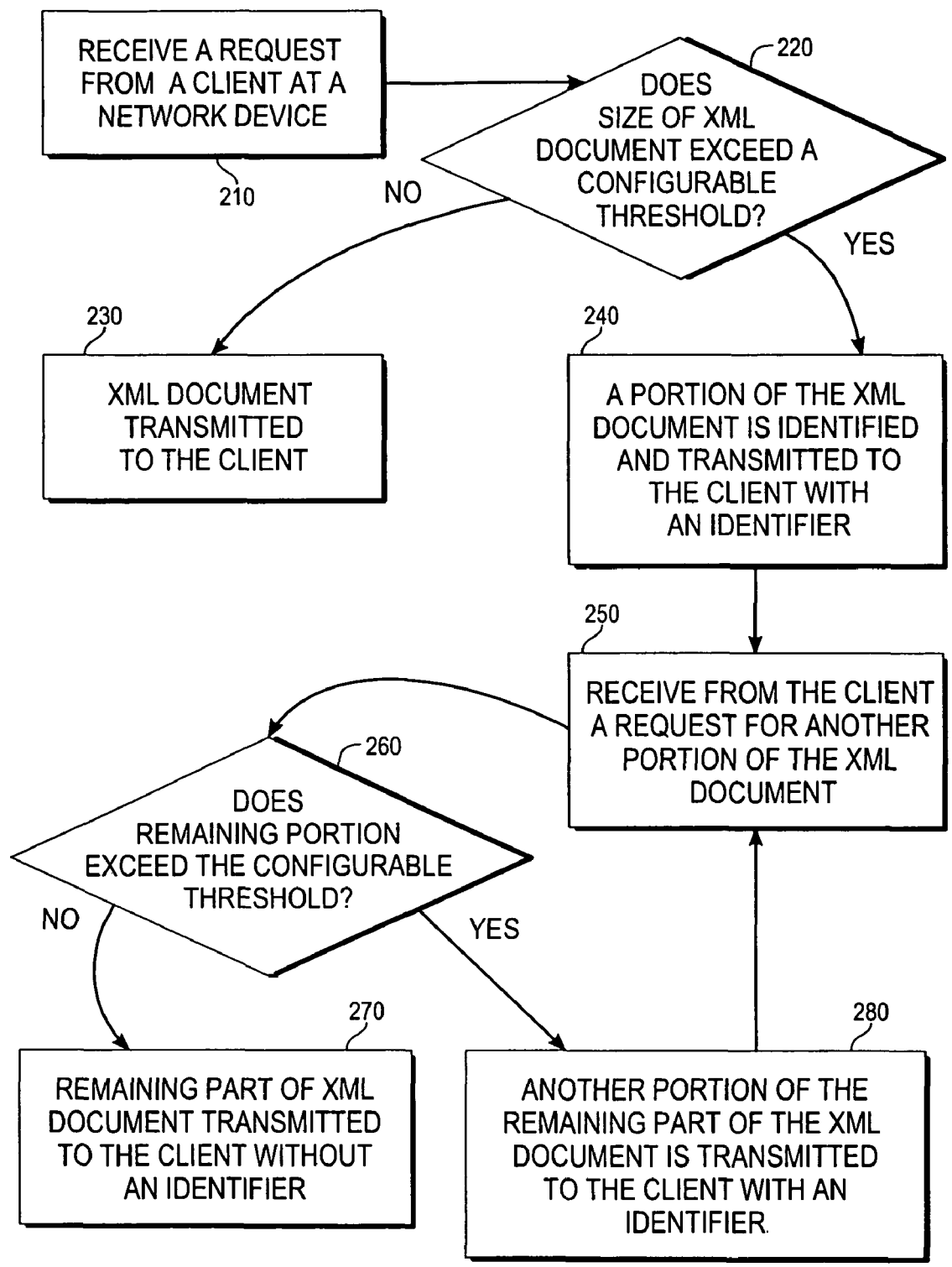
FIG. 2 is flow chart illustrating the functional steps of a first embodiment.

FIG. 2 is a flow chart illustrating the functional steps of a first embodiment. By performing the steps of FIG. 2, when the size of a XML document is larger than a configurable size, network device 130 may transmit two or more chunks of the XML document to client 110, thus ensuring that each chunk of the XML document transmitted from network device 130 to client 110 does not exceed a configurable size. Further, as explained in greater detail below, client 110 may abort receiving additional chunks of the XML document after receiving the first chunk of the XML document.

In step 210, a request is received from client 110 at request interface 132 of network device 130. The request requires that response data be transmitted to client 110 in a XML document. Response data is data that describes a result of performing the received request on network device 130.

The request of step 210 may be directed to a variety of activities, e.g., the request may be to retrieve data describing the operational state of network device 130 or to retrieve a current configuration about network device 130. Indeed, the request of step 210 may be any request for any activity that, as a result of processing the request on network device 130, a set of response data is generated and transmitted to client 110 in a XML document. A XML document is any communication sent from network device 130 to client 110 that conforms to the XML standard, e.g., it is a text-based document composed of tags and associated values.

The request of step 210 may be transmitted from client 110 to network device 130 in an XML document. Example 1 illustrates a request transmitted from client 110 to network device 130 in an XML document that requests information about the current configuration of a BGP component of network device 130.

Example 1

```
<?xml version = "1.0" encoding = "UTF-8"?>
<Request MajorVersion = "1" MinorVersion = "0">
  <Get>
    <Configuration>
      <BGP MajorVersion = "1" MinorVersion = "0"/>
    </Configuration>
  </Get>
</Request>
```

After the request of step 210 is received at network device 130, the request is processed on network device 130 to generate the response data. For example, as a result of receiving the request of Example 1, response data is generated at network device 130 that describes information about the current configuration of a BGP component of network device 130. After the performance of step 210, processing proceeds to step 220.

In step 220, a XML document that contains the response data is generated, and a determination is made as to whether the size of the XML document exceeds a configurable threshold. In one embodiment, determining whether the size of the XML document exceeds a configurable threshold involves determining whether the size of the XML document when expressed in ASCII is greater than a specified size. In other embodiments, the XML text could be compressed before transmission, and the compressed size could be considered. In an embodiment, generating the response data does not involve generating the entirety of an XML document response. Instead, as an XML document is generated, the process determines whether the size of the XML document has reached a particular threshold size. If so, then the process stops adding any further XML text to the XML documents. State information is saved, so that when a future iterator request is received, the process can continue at the point at which it stopped. In this approach, excess memory overhead is avoided. Various functional components of network device 130 may generate a XML document that includes the response data in tags and/or associated values of the XML document. For example, iterator manager 134 may create a XML document that contains the response data that was created in step 210.

Iterator manager 134 determines if the size of the XML document exceeds a configurable threshold. The purpose of the configurable threshold is to ensure that the size of all XML documents transmitted from network device 130 to client 110 is under a certain size. An administrator may configure the configurable threshold to be any size, e.g., 64 K. An administrator may assign the configurable threshold based on the capabilities of the network device 130 and of the communications link 120.

If the size of the XML document created in step 220 does not exceed the configurable threshold, then processing proceeds to step 230. However, if the size of the XML document does exceed the configurable threshold, then processing proceeds to step 240.

In step 230, the XML document is transmitted to client 110 by request interface 132. As the size of the XML document is under the configurable threshold, there is no concern that the XML document is too large in size to place a burden on either communications link 120 or client 110.

In step 240, a chunk of the XML document is identified and transmitted to client 110. The purpose of step 240 is to send only a chunk of the XML document at a time, since the entire XML document may be too large for client 110 to efficiently process at once as the size of the XML document exceeds the configurable threshold, to address the restriction of memory overhead on the server for storing the XML response, to break up a response if a responding element knows that the next section will take a long time to process, etc. The portion that is transmitted to client 110 at step 240 is a complete XML document; it is called a "chunk" or "portion" only because it is a subset of the XML document.

Iterator manager 134 may identify the chunk of the XML document transmitted to client 110 in step 240 based on a configurable intended size of the chunk. For example, an administrator may configure an intended size of chunks of the XML documents transmitted from network device 130 to client 110, e.g., a size of 48 K bytes. The administrator may set the size of chunks of the XML document to be equal to the threshold used in step 220. The size of chunks may be established, by an administrator, to be any size equal or less than the size of the threshold. Iterator manager 134 determines the chunk of the XML document transmitted to client 110 in step 240 by determining a part of the XML document that has a size that is less than the size of the chunk. An administrator may configure different sizes of the chunk for different transport protocols.

The iterator manager 134 may process the XML document in sequence, i.e., the iterator manager 134 may determine the chunk of step 240 by taking the first part of the XML document that corresponds with the configurable intended size of the chunk.

Iterator manager 134 includes an identifier in the chunk transmitted to client 110. The identifier indicates that the entire XML document has not been transmitted to the client 110. Thus, when client 110 receives the chunk with the identifier, the identifier indicates to client 110 that the chunk is not the complete XML document, but rather there are one or more additional chunks of the XML document that have not been transmitted to client 110. The identifier may be included in a particular tag or attribute of the chunk. Example 2 is an illustration of a tag that may be included in the chunk to indicate the identifier.

Example 2

<Identifier="5734">

Note in Example 2, the value of the identifier (5734), uniquely identifies the XML document.

Example 3 is an illustration of the chunk of the XML document that is transmitted from network device 130 to client 110 in step 240.

Example 3

<?xml version = "1.0" encoding ="UTF-8"?>
<Response MajorVersion = "1" MinorVersion = "0" Identifier ="5734">
  <Get>
    <Configuration>
      <BGP MajorVersion = "1" MinorVersion = "0">
      . . .
      1ˢᵗ block of response data resides here.

-continued

```
      . . .
      </BGP>
    </Configuration>
  </Get>
</Response>
```

After the performance of step 240, processing proceeds to step 250.

In step 250, a request from client 110 is received at request interface 132 for another chunk of the XML document. The request of step 250 contains the identifier, thus allowing iterator manager 134 to determine the XML document to which the request is associated. For example, Example 4 illustrates a request from client 110 to receive another chunk of the XML document.

Example 4

<?xml version = "1.0" encoding ="UTF-8"?>
<Request MajorVersion = "1" MinorVersion = "0">
  <GetNext Identifier = "5734"/>
</Request>

After the performance of step 250, processing proceeds to step 260.

In step 260, iterator manager 134 determines if the remaining part of the XML document that was not transmitted to the client in step 240 exceeds the configurable threshold. If iterator manager 134 determines that the remaining part of the XML document that was not transmitted to the client in step 240 does not exceed the configurable threshold, then processing proceeds to step 270. On the other hand, if iterator manager 134 determines that the remaining part of the XML document that was not transmitted to the client in step 240 does exceed the configurable threshold, then processing proceeds to step 280.

In step 270, the remaining chunk of the XML document is transmitted to client 110 without the inclusion of the identifier. Since the remaining chunk of the XML document was received at client 110 without the inclusion of the identifier, client 110 is informed that this chunk is the last chunk of the XML document. Consequently, at the conclusion of step 270, client 110 has received the entire XML document in two or more chunks that each has a size less than the configurable threshold.

In step 280, another chunk of the part of the XML document that was not transmitted to the client in step 240 is identified and subsequently transmitted to client 110. As in step 240, iterator manager 134 may determine the next chunk of the remainder of the XML document that was not transmitted to client 110 based on the configurable intended size of the chunk.

After the next chunk is transmitted to client 110 in step 280, client 110 may determine that client 110 has not yet received the entire XML document because the chunk transmitted the client in step 280 includes the identifier. Client 110 may thereafter issue another request for the remaining chunks of the XML document that it has not received yet. Once network device 130 receives another request from client 110 for another chunk of the XML document, processing proceeds to step 250. In this way, client 110 may issue requests to network device 130 to retrieve additional chunks of the XML document until the last chunk (the chunk whose size is less than the configurable intended size of the chunk) is received in step 270.

Note that in some embodiments, client 110 may issue an abort request. An abort request indicates that client 110 no longer wishes to receive additional chunks of the XML document. The abort request advantageously allows client 110 to avoid receiving the entire XML document if client 110 determines that the whole XML document is not needed. After network device 130 receives an abort request from client 110, network device 130 does not transmit any chunk of the XML document to client 110, and may assign a state to the remaining chunk of the XML document that indicates that the remaining chunk may be deleted. In other words, the network device 130 may free up its resources, as there is no need to store the remaining chunk of the XML document, as it is no longer needed.

The abort request may be implemented by using an XML tag in an XML document. Example 5 is an illustration of an abort request issued by client 110.

Example 5

```
<?xml version = "1.0" encoding ="UTF-8"?>
<Request MajorVersion = "1" MinorVersion = "0">
  <GetNext Identifier = "5734" Abort = "True"/>
</Request>
```

Appendix A describes an illustrative exchange of communications between client 110 and network device 130 according to an embodiment. The communications of Appendix A show client 110 requesting all BGP configuration data of network device 130, and the resulting XML document containing the BGP configuration data is so large four separate communications, each communication containing a chunk of the XML document, are required to transmit the XML document to client 110.

Retrieving XML Documents Using Version Data

Figure 3:
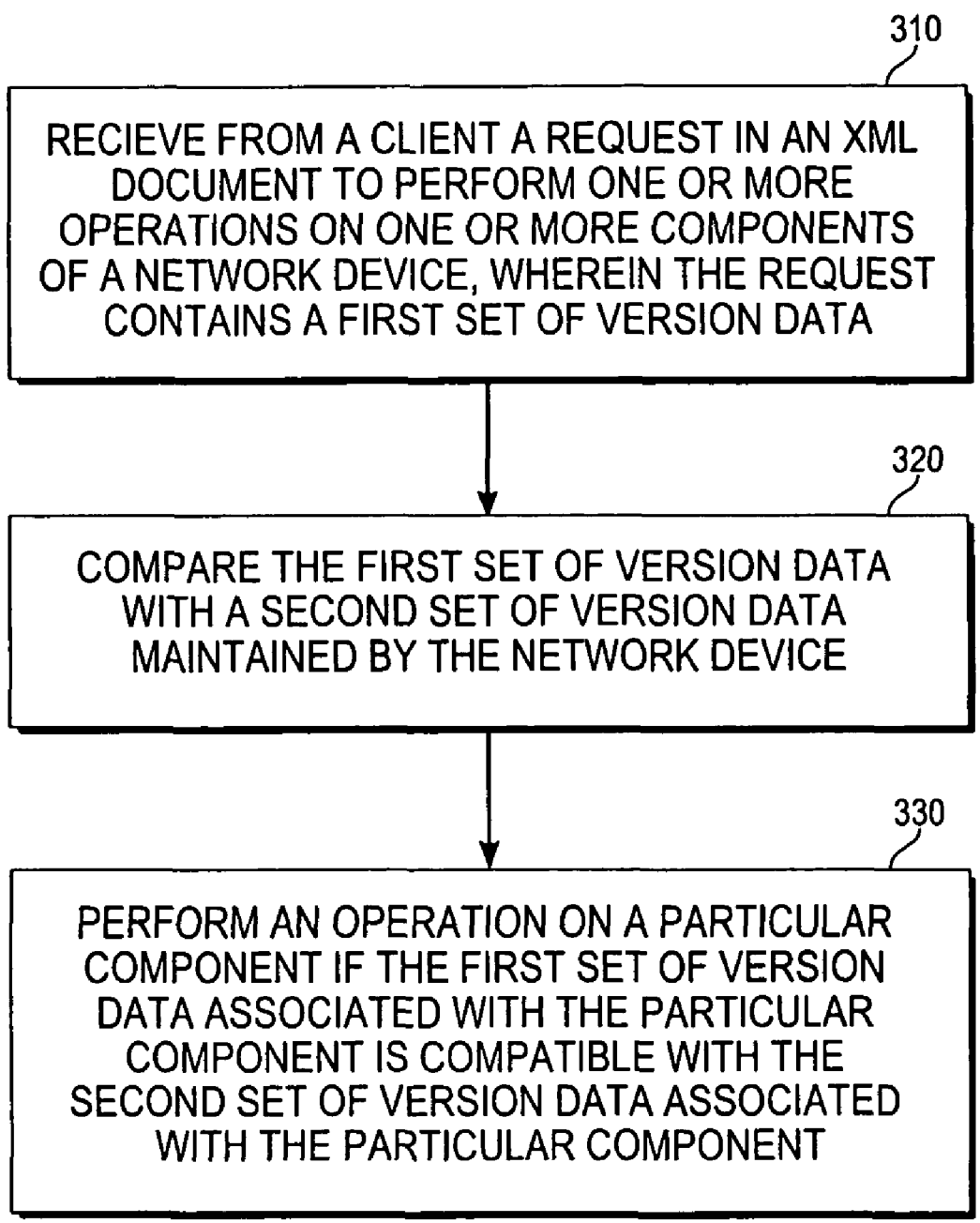
FIG. 3 is flow chart illustrating the functional steps of a second embodiment.

FIG. 3 is a flow chart illustrating the functional steps of another embodiment. By performing the steps of FIG. 3, client 110 and network device 130 may each discover which version of a data schema associated with a component of network device 130 each other is using. Client 110 and network device 130 may exchange XML documents that include version data that identifies a version of a plurality of data schemas that are each associated with a component of network device 130. By including version data in exchanged XML documents, client 110 and network device 130 may avoid exchanging ambiguous communications due to inconsistent versions of a data schema used by client 110 and network device 130.

In step 310, a request, from client 110, is received at request interface 132 of network device 130. The request is to perform one or more operations on one or more components of a plurality of components of network device 130. The request of step 310 may be contained within an XML document.

Each component of the plurality of components refers to any functional component, either in hardware or software, of network device 130, which may be separately configured. For example, each component 138 of the plurality of components may be associated with its own data schema. In an alternate embodiment, two or more components 138 of the plurality of components may be associated with the same data schema.

The request of step 310 contains a first set of version data that identifies, for each component of network device 130 identified in the request, a version of each data schema associated with the component. The request may identify a component when the request specifies that an operation is to be performed against the component. For example, if the request of step 310 specifies that an operation is to be performed against three different components of network device 130, then the request includes a set of version data that identifies a version of a data schema associated with each of the three components.

In one embodiment, version data may comprise a major version value and a minor version value. Both the major version value and the minor version value identify a state of the data schema. The major version value is incremented when the state of a particular data schema is changed in a manner that is not backward compatible, e.g., a data item is deleted or a semantic change is made to the data schema. On the other hand, a minor version value is incremented when the state of a particular data schema is changed in a manner that is backward compatible, e.g., a data item is added to the data schema.

To illustrate, consider Example 1 described above. In the request of Example 1, version data is contained within the tags of the XML document. More specifically, the data schema associated with the request of Example 1 has a major version value of 1, and a minor version value of 0. As Example 1 indicates, the major version value and the minor version value may be included in the tags of an XML document exchanged between client 110 and network device 130. Note that network device 130 maintains a set of version data that may identify a version of the data schema independent from client 110; consequently, network device 130 may have a different major version value and/or a different minor version value than that identified in the request of Example 1. After the performance of step 310, processing proceeds to step 320.

In step 320, the first set of version data contained within the request of step 310 is compared to a second set of version data that is maintained by network device 130. Version manager 136 may maintain the second set of version data. The second set of version data identifies a state of a plurality of data schemas that are each associated with all components of network device 130. Thus, the first set of version data contained within the request of step 310 may identify a state of data schemas associated with components of network device 130 that are involved in the request, while the second set of version data maintained by network device 130 identifies a state of data schemas associated with all components of network device 130. As with the first set of version data, the second set of version data maintained by network device 130 may comprise a major version value and a minor version value for each data schema identified by the version data. Version manager 136 may store the version values in volatile memory for temporary use, or in persistent store 140. Version manager 136 may initially acquire values within a schema that has been previously loaded and parsed by version manager 136, or through a configuration command.

Version manager 136 may make the comparison of step 320 by comparing, for each data schema associated with a component of network device 130 that is referenced by the request of step 310, the first set of version data contained with the request of step 310 with the second set of version data maintained by version manager 136. After the performance of step 320, processing proceeds to step 330.

In step 330, each operation identified in the request of step 310 is performed or not performed based on the comparison of the first set of version data and the second set of version data of step 320. For a particular data schema identified by the first set of version data, if the first set of version data and the second set of version data identify the same state (or version) of the data schema, then the request is performed by network device 130. For a particular data schema identified by the first set of version data, if there is a discrepancy between the first set of version data and the second set of version data involving a change that is not backward compatible or if a data schema identified in the request of step 310 has been updated relative to the corresponding data schema maintained by network device 130, then the operation on that data schema fails (the operation is not performed). On the other hand, for a particular data schema identified by the first set of version data, the operation to be performed on that particular data schema is attempted by network device 130 if the network device 130 has updated its data schema in a manner that is backward compatible.

In an embodiment wherein both the first set of version data and the second set of version data contain a major version value and a minor version value, each operation identified in the request of step 310 is performed or not performed based on the comparison of the major version value and the minor version value of both the first set of version data and the second set of version data of step 320. If both the first set of version data contained in the request from client 110 and the second set of version data maintained by network device 130 reference the same major version value and the same minor version value, then both client 110 and network device 130 are referencing the same state of a data schema, and the operation may be performed against that data schema by network device 130. If there is a difference in the major version values of the first set of version data and the second set of version data, then the operation fails.

For a particular operation to be performed against a data schema identified by a request received by network device 130, if the minor version value of the first set of version data contained within the request from client 110 is a lesser value than the minor version value of the second set of version data maintained by network device 130 (a condition identified as minor version lag), then the operation is attempted by network device 130.

For a particular operation to be performed against a data schema identified by a request received by network device 130, if the minor version value of the first set of version data contained within the request from client 110 is a greater value than the minor version value of the second set of version data maintained by network device 130 (a condition identified as minor version creep), then the operation is not performed by network device 130.

In this manner, client 110 and network device 130 may avoid exchanging ambiguous communications due to inconsistent versions of a data schema used by client 110 and network device 130 since each communication may identify the version of the data schema that client 110 or network device 130 is currently referencing. If an operation of a request is not performed by network device 130, network device 130 may communicate the reason to client 110 so that client 110 may be notified that there is an inconsistency in the versions of data schemas being referenced by client 110 and network device 130.

Client 110 may issue a request to determine the version of any particular data schema maintained by network device 130. Such a request may be processed on network device 130 using the second set of version data maintained by version manager 136. Example 6 is an illustration of a request from client 110 to retrieve version data associated with a BGP component of network device 130. Example 7 is an illustration of the response from network device 130 after receiving the request of Example 6.

Example 6

```
<?xml version = "1.0" encoding = "UTF-8">
<Request MajorVersion = "1" MinorVersion = "0">
  <GetVersionInfo>
    <Configuration>
      <BGP/>
    </Configuration>
  </GetVersionInfo>
</Request>
```

Example 7

```
<?xml version = "1.0" encoding = "UTF-8">
<Response MajorVersion = "1" MinorVersion = "0">
  <GetVersionInfo>
    <Configuration>
      <BGP MajorVersion = "1" MinorVersion = "0"/>
    </Configuration>
  </GetVersionInfo>
</Response>
```

The response of Example 7, and all other responses, includes a major version number and a minor version number. Client 110 may issue a request to determine the version of all data schemas maintained by network device 130. Such a request may be processed on network device 130 using the second set of version data maintained by version manager 136. Example 8 is an illustration of a request from client 110 to retrieve version data associated with all configuration data schemas maintained by network device 130. Example 9 is an illustration of the response from network device 130 after receiving the request of Example 8.

Example 8

```
<?xml version = "1.0" encoding = "UTF-8"?>
<Request MajorVersion = "1" MinorVersion = "0">
  <GetVersionInfo>
    <Configuration/>
  </GetVersionInfo>
</Request>
```

Example 9

```
<?xml version = "1.0" encoding = "UTF-8"?>
<Response MajorVersion = "1" MinorVersion = "0">
  <GetVersionInfo>
    <Configuration>
      ...
      <MPLS_LSD MajorVersion = "1" MinorVersion = "0"/>
      <MPLS_TE MajorVersion = "1" MinorVersion = "0"/>
      <OUNI MajorVersion = "1" MinorVersion = "0"/>
      <OLM MajorVersion = "1" MinorVersion = "0"/>
```

```
        <BGP MajorVersion = "1" MinorVersion = "0"/>
        <CDP MajorVersion = "1" MinorVersion = "0"/>
        <RSVP MajorVersion = "1" MinorVersion = "0"/>
        ...
        <InterfaceConfiguration>
            <CDP MajorVersion = "1" MinorVersion = "0"/>
            <SONET MajorVersion = "1" MinorVersion = "0"/>
            <PPP MajorVersion = "1" MinorVersion = "0">
                <IPCP MajorVersion = "1" MinorVersion = "0"/>
            </PPP>
            ...
        </InterfaceConfiguration>
        ...
      </Configuration>
    </GetVersionInfo>
  </Response>
```

In still another embodiment, Client 110 may issue a request that does not contain either a major version number or minor version number. Network device 130 detects the absence of version values as part of step 310 or step 320. Network device 130 assumes, in such a case, that its own data schema at a default or native version level is to be used. Network device 130 does not issue an error message, but instead attempts to respond to the request from the client according to that data schema. If the network device 130 encounters any XML in the request of the client 110 that the network device cannot process or does not recognize, then the network device fails processing and issues an appropriate error message.

In yet another embodiment, the iterator approach and the versioning approach described herein are integrated. In the integrated approach, a client 110 sends a request to network device 130 that requires the network device to create a large XML document as a response. The client 110 receives a first chunk of a response XML document from network device 130, and the response document includes a major version number and minor version number. The client 110 determines that the major version number and minor version number contained in the response XML document do not match the version numbers of the data schema that the client is using. The client 110 then does not issue any subsequent requests for further chunks of the response XML document. As described above, the network device 130 does not create an entire response XML document before sending the first chunk. Thus, this approach prevents needless use of server or network device memory resources in the case when a client aborts retrieval of the XML document because of a version incompatibility as described here.

In one embodiment, the following schema may be used to define version numbers. The version numbers are carried in the XML instances using the "MajorVersion" and "MinorVersion" attributes. The following example shows the relevant portion of the complex type definition for an element that carries version information.

```
<xsd:complexType name="ipv4_bgp_cfg_BGP_type">
    <xsd:annotation>
        <xsd:documentation>Global        BGP
config</xsd:documentation>
        <xsd:appinfo>
            <MajorVersion>1</MajorVersion>
            <MinorVersion>0</MinorVersion>
            <TaskIdInfo TaskGrouping="Single">
                <TaskName>bgp</TaskName>
            </TaskIdInfo>
        </xsd:appinfo>
```
```
    </xsd:annotation>
    ...
    <xsd:attributeGroup ref="VersionAttributeGroup"/>
    ...
</xsd:complexType>
```

The attribute group "VersionAttributeGroup" is defined as:

```
<xsd:attributeGroup name "VersionAttributeGroup">
    <xsd:annotation>
        <xsd:documentation>
            Common version information attibutes
        </xsd:documentation>
    </xsd:annotation>
    <xsd:attribute              name="MajorVersion"
type="xsd:unsignedInt" use="required"/>
    <xsd:attribute              name="MinorVersion"
type="xsd:unsignedInt" use="required"/>
</xsd:attributeGroup>
```

Implementing Mechanisms

Figure 4:
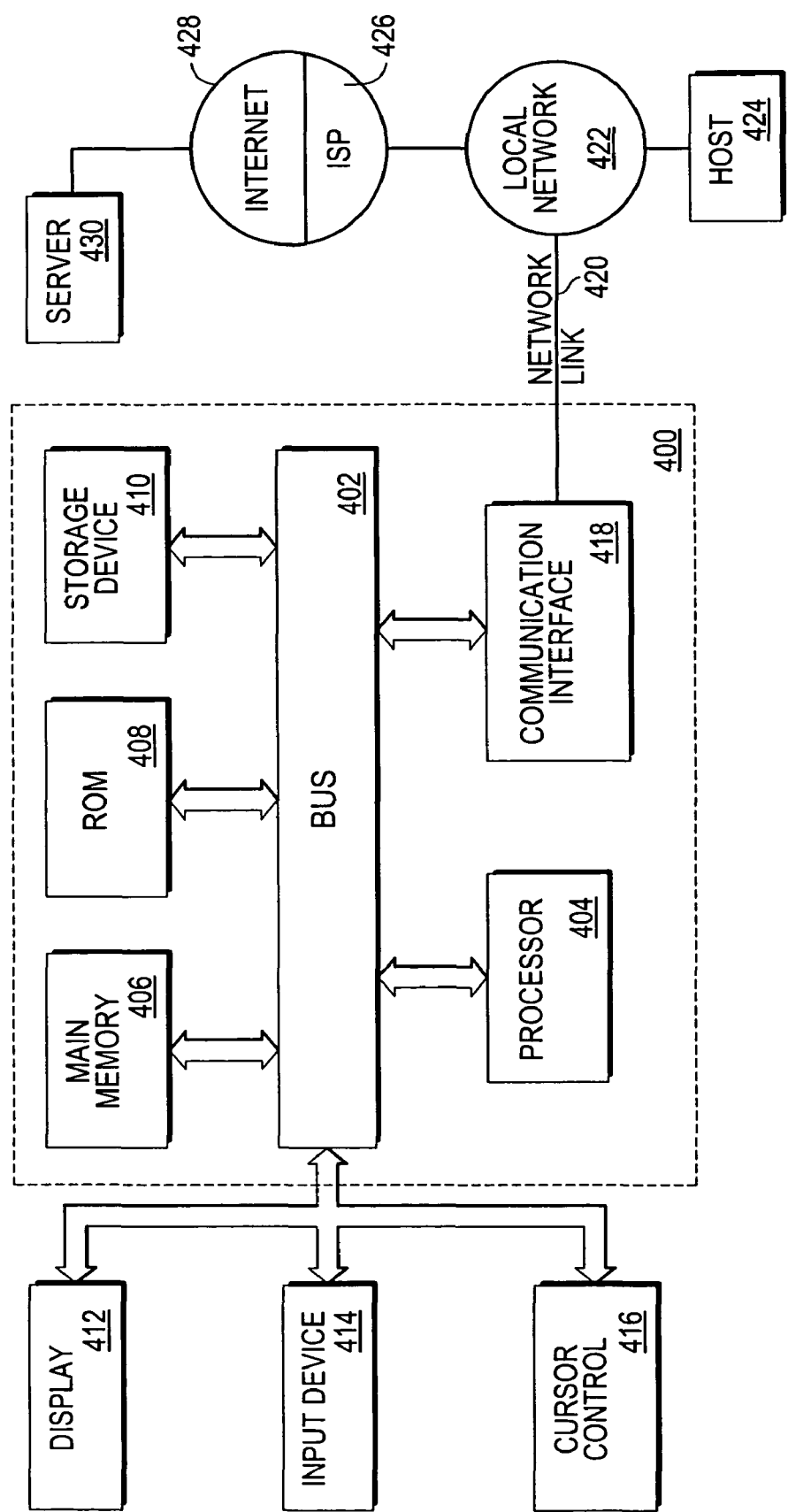
FIG. 4 is a block diagram that illustrates a computer system upon which an embodiment may be implemented.

Client 110 and network device 130 may be implemented on a computer system. FIG. 4 is a block diagram that illustrates a computer system 400 upon which an embodiment may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

APPENDIX A

Appendix A describes an illustrative exchange of communications between client 110 and network device 130 according to an embodiment. The communications of Appendix A show client 110 requesting all BGP configuration data of network device 130 for a particular BGP autonomous system, and the resulting XML document containing the BGP configuration data is so large four separate communications, each communication containing a portion of the XML document, are required to transmit the XML document to client 110. Each chunk provided by the network device to the client is a complete, well-formed XML document.

Communication from client 110 to network device 130
```
<?xml version = "1.0" encoding = "UTF-8"?>
<Request MajorVersion = "1" MinorVersion ="0">
   <Get>
      <Configuration>
         <BGP MajorVersion = "1" MinorVersion = "0"/>
      </Configuration>
   </Get>
</Request>
```
Communication from network device 130 to client 110
```
<Response MajorVersion = "1" MinorVersion ="0" Identifier = "1">
   <Get>
      <Configuration>
         <BGP MajorVersion = "1" MinorVersion = "0">
            ...
            1st block of response data returned here.
            ...
         </BGP>
      </Configuration>
   </Get>
</Response>
```

-continued

```
Communication from client 110 to network device 130
<?xml version = "1.0" encoding = "UTF-8"?>
<Request MajorVersion = "1" MinorVersion ="0">
   <GetNext Identifier = "1"/>
</Request>
Communication from network device 130 to client 110
<?xml version = "1.0" encoding = "UTF-8"?>
<Response MajorVersion = "1" MinorVersion ="0" Identifier = "1">
   <Get>
      <Configuration>
         <BGP MajorVersion = "1" MinorVersion = "0">
         ...
         2nd block of response data returned here.
         ...
         </BGP>
      </Configuration>
   </Get>
</Response>
Communication from client 110 to network device 130
<?xml version = "1.0" encoding = "UTF-8"?>
<Request MajorVersion = "1" MinorVersion ="0">
   <GetNext Identifier = "1"/>
</Request>
Communication from network device 130 to client 110
<?xml version = "1.0" encoding = "UTF-8"?>
<Response MajorVersion = "1" MinorVersion ="0" Identifier = "1">
   <Get>
      <Configuration>
         <BGP MajorVersion = "1" MinorVersion = "0">
         ...
         3rd block of response data returned here.
         ...
         </BGP>
      </Configuration>
   </Get>
</Response>
Communication from client 110 to network device 130
<?xml version = "1.0" encoding = "UTF-8"?>
<Request MajorVersion = "1" MinorVersion ="0">
   <GetNext Identifier = "1"/>
</Request>
Communication from network device 130 to client 110
<?xml version = "1.0" encoding = "UTF-8"?>
<Response MajorVersion = "1" MinorVersion ="0">
   <Get>
      <Configuration>
         <BGP MajorVersion = "1" MinorVersion = "0">
         ...
         Final block of response data returned here.
         ...
         </BGP>
      </Configuration>
   </Get>
</Response>
```

What is claimed is:

1. A machine-implemented method, comprising:

a network device receiving, from a client, a request that requires creating XML response data by adding XML text to an XML document, wherein the XML document, including all of its parts is an entire XML document;

in response to the request, the network device generating a first chunk of the XML document, wherein the first chunk is not the entire XML document;

the network device determining whether a size of the first chunk of the XML document exceeds a configurable threshold size;

in response to determining that the size of the first chunk of the XML document has reached the configurable threshold size, the network device ceasing to add further XML text to the first chunk of the XML document;

saving state information, wherein the state information includes a point at which generation of the XML document stopped;

the network device transmitting only the first chunk of the entire XML document to the client, wherein the first chunk includes an identifier tag that indicates that the entire XML document has not been transmitted to the client and a document number that uniquely identifies a second chunk of the entire XML document that has not been generated;

wherein the identifier tag included in the first chunk identifies the entire XML document, and does not identify only a chunk that is less than the entire XML document; and receiving from the client a request for the second chunk of the entire XML document;

in response to receiving a request for the second portion of the entire XML document, adding XML text to the second portion of the entire XML document at the point at which document generation stopped;

wherein the request for the second portion includes the document number;

in response to receiving a subsequent request from the client, determining if a size of a remaining chunk exceeds the configurable threshold size, wherein the remaining chunk is the portion of the entire XML document that has not been generated and transmitted to the client;

in response to determining that the size of the remaining chunk does exceed the configurable threshold size, generating and transmitting only a next chunk of the entire XML document to the client, wherein the next chunk is a next sequential portion of the entire XML document, wherein the entire XML document has not yet been generated and transmitted and the next chunk includes the identifier tag; and in response to determining that the size of the remaining chunk does not exceed the configurable threshold size, generating and transmitting the remaining chunk of the entire XML document to the client, wherein the remaining chunk is a last portion in sequence of the entire XML document and the remaining chunk does not include the identifier tag.

2. The method of claim 1, wherein the request is a first request, and the method further comprises:

in response to receiving, from the client, a subsequent request that indicates that a remaining chunk of the entire XML document that has not been transmitted to the client is not to be transmitted to the client, assigning a state to the remaining chunk that indicates that the remaining chunk may be deleted.

3. A machine-implemented method, comprising:

a network device receiving, from a client, a request contained within an XML document to perform one or more operations on one or more components of a plurality of components of the network device, wherein the request contains a first set of version data that identifies a first version for each data schema in a plurality of data schemas that are associated with each of the one or more components;

the network device comparing the first set of version data with a second set of version data to determine whether to perform a particular operation of the one or more operations, wherein the second set of version data is maintained by the network device and indicates a second version of each data schema of the plurality of components;

in response to determining, for a particular component in the one or more components, that the first set of version data associated with the particular component is compatible with the second set of version data associated with the particular component, performing the particular operation on the particular component of the network device;

wherein the first set of version data includes, for each component in the one or more components, a first minor version value and a first major version value, and wherein the second set of version data includes, for each component in the plurality of components, a second minor version value and a second major version value, wherein the first minor version value and the second minor version value indicate a change to an XML schema that is backward compatible, and wherein the first major version value and the second major version value indicate a change to the XML schema that is not backward compatible.

4. A machine-readable storage medium storing one or more sequences of instructions, wherein execution of the one or more sequences of instructions by one or more processors causes the one or more processors to perform the steps of:

receiving, from a client, a request that requires creating XML response data by adding XML text to an XML document, wherein the XML document, including all of its parts is an entire XML document;

in response to the request, generating a first chunk of the XML document, wherein the first chunk is not the entire XML document;

determining whether a size of the first chunk of the XML document exceeds a configurable threshold size;

in response to determining that the size of the first chunk of the XML document has reached the configurable threshold size, the network device ceasing to add further XML text to the first chunk of the XML document;

saving state information, wherein the state information includes a point at which generation of the XML document stopped;

the network device transmitting only the first chunk of the entire XML document to the client, wherein the first chunk includes an identifier tag that indicates that the entire XML document has not been transmitted to the client and a document number that uniquely identifies a second chunk of the entire XML document that has not been generated;

wherein the identifier tag included in the first chunk identifies the entire XML document, and does not identify only a chunk that is less than the entire XML document; and receiving from the client a request for the second chunk of the entire XML document;

in response to receiving a request for the second portion of the entire XML document, adding XML text to the second portion of the entire XML document at the point at which document generation stopped;

wherein the request for the second portion includes the document number;

in response to receiving a subsequent request from the client, determining if a size of a remaining chunk exceeds the configurable threshold size, wherein the remaining chunk is the portion of the entire XML document that has not been generated and transmitted to the client;

in response to determining that the size of the remaining chunk does exceed the configurable threshold size, generating and transmitting only a next chunk of the entire XML document to the client, wherein the next chunk is a next sequential portion of the entire XML document, wherein the entire XML document has not yet been generated and transmitted and the next chunk includes the identifier tag; and in response to determining that the size of the remaining chunk does not exceed the configurable threshold size, generating and transmitting the remaining chunk of the entire XML document to the client, wherein the remaining chunk is a last portion in sequence of the entire XML document and the remaining chunk does not include the identifier tag.

5. The machine-readable storage medium of claim 4, wherein the request is a first request, and wherein execution of the one or more sequences of instructions by the one or more processors causes the one or more processors to further perform the step of:

in response to receiving, from the client, a subsequent request that indicates that a remaining chunk of the entire XML document that has not been transmitted to the client is not to be transmitted to the client, assigning a state to the remaining chunk that indicates that the remaining chunk may be deleted.

6. A machine-readable storage medium storing one or more sequences of instructions, wherein execution of the one or more sequences of instructions by one or more processors causes the one or more processors to perform the steps of:

receiving, from a client, a request contained within an XML document to perform one or more operations on one or more components of a plurality of components of a network device, wherein the request contains a first set of version data that identifies a first version for each data schema in a plurality of data schema that is associated with each of the one or more components;

comparing the first set of version data with a second set of version data to determine whether to perform a particular operation of the one or more operations, wherein the second set of version data is maintained by the network device and indicates a second version of each data schema of the plurality of components;

in response to determining, for a particular component in the one or more components, that the first set of version data associated with the particular component is compatible with the second set of version data associated with the particular component, performing the particular operation on the particular component of the network device;

wherein the first set of version data includes, for each component in the one or more components, a first minor version value and a first major version value, and wherein the second set of version data includes, for each component in the plurality of components, a second minor version value and a second major version value, wherein the first minor version value and the second minor version value indicate a change to an XML schema that is backward compatible, and wherein the first major version value and the second major version value indicate a change to the XML schema that is not backward compatible.

7. An apparatus, comprising:

one or more processors;

means for receiving, from a client, a request that requires creating XML response data by adding XML text to an XML document, wherein the XML document, including all of its parts is an entire XML document;

in response to the request, means for generating a first chunk of the XML document, wherein the first chunk is not the entire XML document;

means for determining whether a size of the first chunk of the XML document exceeds a configurable threshold size; and in response to determining that the size of the first chunk of the XML document has reached the configurable threshold size, means for ceasing to add further XML text to the first chunk of the XML document;

means for saving state information, wherein the state information includes a point at which generation of the XML document stopped;

means for the network device transmitting only the first chunk of the entire XML document to the client, wherein the first chunk includes an identifier tag that indicates that the entire XML document has not been transmitted to the client and a document number that uniquely identifies a second chunk of the entire XML document that has not been generated;

wherein the identifier tag included in the first chunk identifies the entire XML document, and does not identify only a chunk that is less than the entire XML document; and means for receiving from the client a request for the second chunk of the entire XML document;

in response to receiving a request for the second portion of the entire XML document, means for adding XML text to the second portion of the entire XML document at the point at which document generation stopped;

wherein the request for the second portion includes the document number;

means for determining if a size of a remaining chunk exceeds the configurable threshold size, wherein the remaining chunk is the portion of the entire XML document that has not been generated and transmitted to the client;

means for generating and transmitting only a next chunk of the entire XML document to the client, wherein the next chunk includes the identifier tag in response to determining that the size of the remaining chunk does exceed the configurable threshold size; and means for generating and transmitting the remaining chunk of the entire XML document to the client, wherein the remaining chunk does not include the identifier tag in response to determining that the size of the remaining chunk does not exceed the configurable threshold size.

8. The apparatus of claim 7, wherein the request is a first request, and the apparatus further comprises:

means for assigning a state to a remaining chunk that indicates that the remaining chunk may be deleted in response to receiving, from the client, a subsequent request that indicates that the remaining chunk of the entire XML document that has not been transmitted to the client is not to be transmitted to the client.

9. An apparatus, comprising:

one or more processors;

means for receiving, from a client, a request contained within an XML document to perform one or more operations on one or more components of a plurality of components of a network device, wherein the request contains a first set of version data that identifies a first version for each data schema in a plurality of data schema that is associated with each of the one or more components;

means for comparing the first set of version data with a second set of version data to determine whether to perform a particular operation of the one or more operations, wherein the second set of version data is maintained by the network device and indicates a second version of each data schema of the plurality of components;

means for performing the particular operation on the particular component of the network device in response to determining, for a particular component in the one or more components, that the first set of version data associated with the particular component is compatible with the second set of version data associated with the particular component;

wherein the first set of version data includes, for each component in the one or more components, a first minor version value and a first major version value, and wherein the second set of version data includes, for each component in the plurality of components, a second minor version value and a second major version value, wherein the first minor version value and the second minor version value indicate a change to an XML schema that is backward compatible, and wherein the first major version value and the second major version value indicate a change to the XML schema that is not backward compatible.

10. An apparatus comprising a memory storing instructions which, when executed by one or more processors, cause the one or more processors to perform the steps of:

receiving, from a client, a request that requires creating XML response data by adding XML text to an XML document, wherein the XML document, including all of its parts is an entire XML document;

in response to the request, the network device generating a first chunk of the XML document, wherein the first chunk is not the entire XML document;

the network device determining whether a size of the first chunk of the XML document exceeds a configurable threshold size;

in response to determining that the size of the first chunk of the XML document has reached the configurable threshold size, the network device ceasing to add further XML text to the first chunk of the XML document;

saving state information, wherein the state information includes a point at which generation of the XML document stopped;

the network device transmitting only the first chunk of the entire XML document to the client, wherein the first chunk includes an identifier tag that indicates that the entire XML document has not been transmitted to the client and a document number that uniquely identifies a second chunk of the entire XML document that has not been generated;

wherein the identifier tag included in the first chunk identifies the entire XML document, and does not identify only a chunk that is less than the entire XML document; and receiving from the client a request for the second chunk of the entire XML document;

in response to receiving a request for the second portion of the entire XML document, adding XML text to the second portion of the entire XML document at the point at which document generation stopped;

wherein the request for the second portion includes the document number;

in response to receiving a subsequent request from the client, determining if a size of a remaining chunk exceeds the configurable threshold size, wherein the remaining chunk is the portion of the entire XML document that has not been generated and transmitted to the client;

in response to determining that the size of the remaining chunk does exceed the configurable threshold size, generating and transmitting only a next chunk of the entire XML document to the client, wherein the next chunk includes the identifier tag; and in response to determining that the size of the remaining chunk does not exceed the configurable threshold size, generating and transmitting the remaining chunk of the entire XML document to the client, wherein the remaining chunk does not include the identifier tag.

11. The apparatus of claim 10, wherein the request is a first request, and wherein the instructions which, when executed by one or more processors, further cause the one or more processors to perform the step of:

in response to receiving, from the client, a subsequent request that indicates that a remaining chunk of the entire XML document that has not been transmitted to the client is not to be transmitted to the client, assigning a state to the remaining chunk that indicates that the remaining chunk may be deleted.

12. An apparatus comprising a memory storing instructions which, when executed by one or more processors, cause the one or more processors to perform the steps of:

receiving, from a client, a request contained within an XML document to perform one or more operations on one or more components of a plurality of components of a network device, wherein the request contains a first set of version data that identifies a first version for each data schema in a plurality of data schema that is associated with each of the one or more components;

comparing the first set of version data with a second set of version data to determine whether to perform a particular operation of the one or more operations, wherein the second set of version data is maintained by the network device and indicates a second version of each data schema of the plurality of components;

in response to determining, for a particular component in the one or more components, that the first set of version data associated with the particular component is compatible with the second set of version data associated with the particular component, performing the particular operation on the particular component of the network device;

wherein the first set of version data includes, for each component in the one or more components, a first minor version value and a first major version value, and wherein the second set of version data includes, for each component in the plurality of components, a second minor version value and a second major version value, wherein the first minor version value and the second minor version value indicate a change to an XML schema that is backward compatible, and wherein the first major version value and the second major version value indicate a change to the XML schema that is not backward compatible.

13. A machine-implemented method, comprising:

sending a request to a network device, wherein the request requires the network device to create XML response data by adding XML text to a document, wherein a size of the document exceeds a configurable threshold size;

receiving, when a size of an entire XML document exceeds a configurable threshold size, only a first chunk of the entire XML document, wherein the first chunk is a first part in sequence of an untransmitted portion of the entire XML document and includes an identifier tag that indicates that the entire XML document has not been transmitted, wherein the first chunk contains a first set of version data that identifies a first version for each data schema in a plurality of data schemas;

comparing the first set of version data with a second set of version data, wherein the second set of version data indicates a second version of a data schema;

determining not to request an additional chunk of the entire XML document when the first set of version data is incompatible with the second set of version data;

wherein sending, receiving, comparing, and determining are performed by a client implemented on a computer system;

wherein the first set of version data includes, for each component in the one or more components, a first minor version value and a first major version value, and wherein the second set of version data includes, for each component in the plurality of components, a second minor version value and a second major version value, wherein the first minor version value and the second minor version value indicate a change to an XML schema that is backward compatible, and wherein the first major version value and the second major version value indicate a change to the XML schema that is not backward compatible.

* * * * *